United States Patent Office 3,081,338
Patented Mar. 12, 1963

3,081,338
METHOD OF REACTING HYDROCARBOYL MANGANESE POLYCARBONYLS
Kestutis A. Keblys, West Lafayette, Ind., assignor to Ethyl Corporation, New York, N.Y., a corporation of Delaware
No Drawing. Filed May 19, 1960, Ser. No. 30,074
9 Claims. (Cl. 260—476)

The present invention relates to a reaction for hydrocarboyl manganese polycarbonyls, more particularly to a reaction by which these compounds are cleaved. This application is in part a continuation of application Serial No. 2,825 filed January 18, 1960.

Among the objects of the present invention is the provision of a new reaction which is simple to carry out and which is also desirable.

The above as well as additional objects of the present invention will be more fully understood from the following description of several of its exemplifications.

Hydrocarboyl manganese pentacarbonyls are described in U.S. Patent 2,913,413 granted November 17, 1959 (see particularly columns 17 and 18 of that patent) and also in the above-identified parent application. The hydrocarboyl manganese pentacarbonyl compounds contain a hydrocarbon acyl radical having up to 13 carbon atoms. These compounds have a molecular weight of up to about 395. According to the present invention, these compounds are very readily cleaved by alkali metal hydroxides or alkali metal salts of a hydroxy aliphatic hydrocarbon having up to 13 carbon atoms per molecule. This cleavage converts the hydrocarboyl moiety of the molecule to an acid or an ester of the corresponding acid. In the latter case, the alcohol group of this ester is the hydroxy hydrocarbon whose alkali metal salt is used to effect cleavage. Excellent yields of such esters are obtained in this manner.

The remainder of the hydrocarboyl manganese pentacarbonyl is converted by the cleavage into the alkali metal salt of the acid represented by the formula $HMn(CO)_5$. This alkali metal salt may be recovered, or directly reacted without recovery to form the free acid, or to form hydrocarbyl or hydrocarboyl derivatives corresponding to the starting material which was subjected to the original cleavage.

The hydrocarboyl manganese polycarbonyls that are cleaved in the above manner can also be in the form of ammonia complexes such as those described in the above-mentioned parent application. These complexes are formed by direct combination of hydrocarbyl manganese pentacarbonyls with an ammonia in which not more than two of the ammonia hydrogens are substituted by hydrocarbon radicals having up to thirteen carbons each. One mole of the ammonia is thus combined with one mole of such a pentacarbonyl so that the resulting material has these ingredients in 1:1 proportion. However, one of the carbonyl groups becomes shifted by the complexing reaction to the hydrocarbyl radical and converts it to a hydrocarboyl radical. The remaining four carbonyl groups seem to be unaffected. The hydrocarboyl manganese tetracarbonyl ammonia compounds contain a hydrocarbon acyl radical having up to 13 carbon atoms. These compounds have a molecular weight of up to about 745.

The ammonia complexes are cleaved by the same alkali metal compounds used to cleave the uncomplexed materials and form the same acids or esters. In general, the same reaction conditions are used as with the hydrocarboyl manganese pentacarbonyls. In general, cleavage takes place at temperatures of from about −40° C. to +100° C. with the alkali metal compound in a concentration of at least 0.01 M. The reaction is carried out in a non-aqueous medium when the alkali metal compound is an alkoxide salt. When the alkali metal compound is a hydroxide, the reaction is carried out in an aqueous medium.

The most rapid cleavage using the alkali metal alkoxide is effected when the reaction mixture includes an appreciable amount—generally at least about 10 percent by volume—of a solvent which dissolves or activates the sodium alkoxide salt. Liquid ethers including simple aliphatic monoethers (diethyl ether, di-n-propyl ether, etc.), cyclic ethers, and acyclic polyethers including tetrahydrofurane and the dioxanes, ethylene glycol dimethyl ether and diethylene glycol monoethyl ether, are suitable although alcohols such as methyl, ethyl, n-propyl, isobutyl and so on up to and including n-octyl alcohol and its isomers, can also be used for this purpose. The remaining solvent present, if any, is preferably inert to the reactants and can be a substance such as an aliphatic hydrocarbon that is normally liquid. For best yields of the desired ester as a cleavage product, any alcohol present in the reaction mixture should be the same as the hydroxy hydrocarbon whose alkali metal salt is used to effect cleavage.

Purely inert reaction media, such as a hydrocarbon like n-hexane, are also suitable for cleavage although in such a vehicle the cleavage reaction rate is appreciably lower.

The following examples typify the present invention, all parts being by weight unless otherwise specified:

EXAMPLE I

*Cleavage of Benzoyl Manganese Pentacarbonyl With Sodium Methoxide*

A mixture of 40 parts of benzoyl manganese pentacarbonyl and nine parts of sodium methoxide in 400 parts of diethyl ether was stirred at room temperature under nitrogen for 3.5 hours. The reaction mixture gradually turned from bright yellow to brown. The yellow-brown reaction mixture was then filtered, the filtrate was cooled in Dry Ice and then again filtered while cold. The second filtrate was evaporated in vacuo leaving a red slurry, which darkened on standing. This slurry was distilled at 140° C. and 20 mm. of mercury. There was obtained seven parts of an oily liquid identified by its infrared spectrum as methyl benzoate.

A better yield is obtained by prolonging the cleavage reaction and/or by increasing the reaction temperature within the limits specified above. The Dry Ice treatment separates out residual amounts of unreacted manganese polycarbonyl starting material, and can accordingly be used to follow the reaction. Conducting the entire reaction in contact with air does not seem to affect the yield so long as there is excess sodium alkoxide present.

EXAMPLE II

A solution was formed by dissolving 10 parts of cyclohexyl amine acetyl manganese tetracarbonyl made in accordance with Example I of parent application Serial No. 2,825 in 238 parts of methanol. To this solution was added dropwise a solution containing 1.75 parts of sodium methoxide dissolved in methanol. During the addition, the solution was cooled. After the addition, the solution was stirred at room temperature for 2.5 hours. The resulting solution was then distilled, and the fraction boiling in the range of 43.2–63.9° C. was collected and found to be identical to an authentic methanol-methyl acetate azeotrope. Refractive index data showed that the product contained 1.6 parts of methyl acetate. The azeotrope can be separated into its constituents by use of selective absorbers such as anhydrous calcium chloride which absorbs the methanol but not the methyl acetate.

Twelve milliliters of the azeotrope was refluxed with four milliliters of benzylamine and 0.1 gram of ammonium chloride for 42 hours. Methanol was then distilled off, and the residue was neutralized with aqueous hydrochloric acid. Ether extraction followed by evaporation yielded white crystals which melted at 63–64° C. after recrystallization from n-hexyl ether. No melting point depression was observed when a mixed melting was taken of this compound with an authentic sample of N-benzylacetamide.

EXAMPLE III

To a nitrogen-saturated solution comprising one part of sodium hydroxide in 10 parts of water was added three parts of benzoyl manganese pentacarbonyl in about 89 parts of tetrahydrofuran. The tetrahydrofuran layer changed in color from a light yellow to an amber red in several minutes. The mixture was then stirred under nitrogen for four hours at room temperature. During this time, some gas evolution occurred. The reaction mixture was then filtered to yield a heterogeneous mixture of white and brown particles. These were washed with ether, dissolved in five parts of water and acidified with hydrochloric acid. Vigorous gas evolution occurred which indicated the presence of manganese carbonate. The dark red filtrate was evaporated under reduced pressure leaving a dark red slurry. The slurry was extracted with water to yield a dark brown solution. On standing, the solution precipitated a yellow solid which was identified by infrared as containing manganese carbonyl in admixture with another manganese compound which was insoluble in carbon tetrachloride. The filtrate was concentrated by evaporation and acidified with hydrochloric acid. On cooling, a light yellowish solid precipitated and was filtered and dried to yield 0.1 part of benzoic acid which was identified by its melting point (120.4–122.0° C.) and its infrared spectrum.

EXAMPLE IV

To a solution comprising five parts of acetyl manganese pentacarbonyl in about 21.4 parts of ethyl ether was added 1.31 parts of sodium methoxide. The yellow color of the solution immediately turned to brown. The solution was stirred under nitrogen for 1.5 hours at room temperature. A gradual color change from brown to green was observed. After adding about 22 parts of benzene, the reaction mixture was fractionated using a helices-packed column. Infrared examination of the fractions collected between 36 and 68° C. clearly showed methyl acetate as the major component.

In a similar manner propionyl manganese pentacarbonyl is cleaved by potassium n-amylate in ethylene glycol diethyl ether to provide n-amyl propionate, and ammonia cyclohexanoyl manganese tetracarbonyl is converted by potassium iso-octanoate in diethylene glycolethyl-butyl ether to iso-octyl cyclohexanoate. Other alkali metal alkoxides of other hydroxy aliphatic hydrocarbonyl having up to 13 carbons per molecule, such as allyl alcohol and 1-butyne-4-ol, also give corresponding results. Sodium alkoxides of polyhydroxy aliphatic hydrocarbons such as ethylene glycol and glycerol can also be used to prepare diesters and triesters, respectively. The mono alkoxides are preferred, however. For the purposes of the present invention the alkali metal akoxides can be salts of alcohols having aryl rings in the molecule, and benzyl and toluyl alcohol are representative of such alcohols.

The manganese portion of the cleaved ammonia complex molecule, after cleavage, appears to be in the form of a similar ammonia complex that has sodium in place of the hydrocarboyl group. This residue when treated with an alkyl iodide like methyl iodide disproportionates at room temperature to give a mixture of the alkyl manganese pentacarbonyl and bis(ammonia) iodomanganese tricarbonyl.

The various acids and esters formed by my novel process are organic compounds having a multitude of important known utilities. Thus, for example, they may be utilized as solvents, plasticizers, paint ingredients and as synthesis intermediates generally.

Obviously, many modifications and variations of the present invention are possible in the light of the above teachings. It is, therefore, to be understood that within the scope of the appended claims the invention may be practiced otherwise than as specifically described.

I claim:

1. The process of cleaving a hydrocarbon acyl manganese polycarbonyl compound having up to 13 carbon atoms in the acyl radical, said acyl radical selected from the class consisting of alkylcarbonyl and arylcarbonyl radicals, said compound being selected from the class consisting of hydrocarbon acyl manganese pentacarbonyl compounds having a molecular weight of up to about 395 and hydrocarbon acyl manganese tetracarbonyl ammonia compounds having a molecular weight of up to about 745, wherein not more than two of the ammonia hydrogens are substituted by hydrocarbon radicals having up to 13 carbon atoms, said hydrocarbon radicals being selected from the class consisting of alkyl, cyclohexyl and aryl radicals; said process comprising reacting said hydrocarbon acyl manganese polycarbonyl compound with an alkali metal compound selected from the class consisting of alkali metal hydroxides and alkali metal salts of a monohydroxy hydrocarbon compound having up to 13 carbon atoms, said monohydroxy hydrocarbon compound being selected from the class consisting of alkyl, alkenyl, alkynyl, alkaryl and aralkyl hydroxy compounds.

2. The method of claim 1 wherein the alkali metal compound is an alkali metal salt of an hydroxy aliphatic hydrocarbon having up to 13 carbon atoms per molecule selected from the class consisting of alkyl, alkynyl, alkenyl, alkaryl and aralkyl monohydroxy compounds, and the product formed is the hydrocarboyl ester of the hydroxy hydrocarbon.

3. The method of claim 1 wherein the alkali metal compound is an alkali metal hydroxide, and the product formed is the hydrocarboyl acid.

4. The process of claim 3 wherein the reaction is carried out in an aqueous medium.

5. The process of claim 2 wherein the reaction is carried out in a non-aqueous medium.

6. The method which comprises cleaving benzoyl manganese pentacarbonyl to methylbenzoate with the aid of sodium methoxide in diethylether.

7. The method which comprises cleaving benzoyl manganese pentacarbonyl to benzoic acid with the aid of aqueous sodium hydroxide.

8. The method which comprises cleaving acetyl manganese pentacarbonyl to methyl acetate with the aid of sodium methoxide in diethylether.

9. The method which comprises cleaving cyclohexylamine acetyl manganese tetracarbonyl to methyl acetate with the aid of sodium methoxide dissolved in methanol.

References Cited in the file of this patent

UNITED STATES PATENTS 2,839,552    Shapiro et al.    June 17, 1958
2,913,413    Brown    Nov. 17, 1959

OTHER REFERENCES

Coffield et al.: "J. of Organic Chemistry," volume 22, page 598 (1957).